(12) United States Patent  
Bradshaw et al.

(10) Patent No.: US 10,613,925 B2  
(45) Date of Patent: Apr. 7, 2020

(54) DATA DUPLICATION IN A NON-VOLATILE MEMORY

(71) Applicant: Micron Technology, Inc., Boise, ID (US)

(72) Inventors: Samuel E. Bradshaw, Sacramento, CA (US); Justin Eno, El Dorado Hills, CA (US); Sean Stephen Eilert, Penryn, CA (US); Sai krishna Mylavarapu, Folsom, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 108 days.

(21) Appl. No.: 15/983,647

(22) Filed: May 18, 2018

(65) Prior Publication Data

US 2019/0354429 A1 Nov. 21, 2019

(51) Int. Cl.
*G11C 29/00* (2006.01)
*H03M 13/00* (2006.01)
*G06F 11/10* (2006.01)
*G06F 3/06* (2006.01)

(52) U.S. Cl.
CPC ........ *G06F 11/1004* (2013.01); *G06F 3/0619* (2013.01); *G06F 3/0659* (2013.01); *G06F 3/0679* (2013.01)

(58) Field of Classification Search
CPC .. G06F 11/1004; G06F 3/0619; G06F 3/0659; G06F 3/0679
USPC ........ 714/807, 763, 767, 766, 764, 704, 705
See application file for complete search history.

(56) References Cited

U.S. PATENT DOCUMENTS

| | | | |
|---|---|---|---|
| 10,223,254 B1 * | 3/2019 | Frolikov | G06F 3/0673 |
| 2017/0024127 A1 * | 1/2017 | Bazarsky | G11C 29/52 |
| 2019/0278521 A1 * | 9/2019 | Matsugami | G06F 3/067 |
| 2019/0317673 A1 * | 10/2019 | Tan | G06F 3/0679 |

* cited by examiner

*Primary Examiner* — Christine T. Tu
(74) *Attorney, Agent, or Firm* — Nicholson de Vos Webster & Elliott LLP

(57) ABSTRACT

Exemplary methods, apparatuses, and systems include a memory controller receiving a user payload to be written to a memory. The memory controller determines a plurality of locations within the memory within which the user payload will be written. After detecting the destination of the user payload, the memory controller detects, within a data structure, the presence of an identifier of a first location within a user data portion of the plurality of locations. The memory controller writes the user payload to the user data portion of the plurality of locations and, in response to detecting the presence of the identifier in the data structure, writes a copy of one or more bits in the user payload written to the first location to a spare data portion of the plurality of locations.

20 Claims, 13 Drawing Sheets

FIG. 7

$$1210 \rightarrow\ < b_{N-1} \ldots b_2\ b_1\ b_0 >$$

$$< v\ b_{N-1} \ldots b_2\ b_1\ b_0 > \leftarrow 1220$$

DATA DUPLICATION IN A NON-VOLATILE MEMORY

FIELD OF THE INVENTION

The various embodiments described in this document relate to managing memory devices. Embodiments include a controller storing data and duplicate copies of a portion of that data within one or more spare regions of the memory device.

BACKGROUND OF THE INVENTION

In the field of non-volatile memory, as storage elements are forced closer and closer together to achieve smaller products and more dense media, the storage elements have reduced physical isolation. This reduction in physical isolation, as well as natural variations that arise from a complex manufacturing process, result in a variety of defects, such as storage elements with high read and/or write error rates. Error detection and correction techniques such as error-correcting codes can correct some errors. The capabilities of such techniques, however, are limited. For example, these techniques may become ineffective when the number of errors in a set of data exceeds some limit. Other techniques such as defect remapping may permanently direct a logical memory address associated with a defective physical region to a different physical region, but at the cost of reducing total usable memory.

BRIEF DESCRIPTION OF THE DRAWINGS

The present invention is illustrated by way of example and not limitation in the figures of the accompanying drawings, in which like references indicate similar elements, and in which:

FIG. 7 illustrates an exemplary write unit format and associated mapping to the memory device arrangement illustrated in FIG. 5;

DETAILED DESCRIPTION

This document describes embodiments that include a controller identifying write data destined for a "bad" or poorly performing memory location (e.g., a memory cell with a high error rate) and duplicating that data to a spare portion of the memory. During a read, the duplicate data replaces the data read from the "bad" location. The controller writes the data and duplicates as a group to memory without remapping or substituting physical memory locations. For example, a controller identifies locations within a memory that are "bad" using raw bit error rate (RBER) measurements. During a write operation, the controller builds a block of data containing both the original data and duplicated bits of the original data. The controller determines which of bits of the original data to duplicate based on the location of those original bits within the block of data and the destination location of the block of data once written to memory. The controller organizes the block of data such that the controller writes the duplicates to the designated spare portions of memory along with the original data. During a read operation, the controller reads the block of data and, based on the location of the block of data within the memory, determines which bits in the original data were duplicated. The controller replaces those bits with their duplicate counterparts. As a result, embodiments provide defect and memory performance management strategies. Such defect management strategies may improve yields by tolerating defects without permanently removing all or a portion of a die. By dynamically evaluating RBER and updating which locations include data duplicated to spare, embodiments allow for a runtime "best foot forward" type media management strategy. Additionally, the disclosed defect management strategies can reduce the average input RBER to an error-correcting code (ECC) hierarchy to keep higher tiers of ECC from triggering, which reduces access latency and maintains data correctability across the life cycle of the memory. Furthermore, implementation parameters such as ECC schemes may result in blocks of user and control data that do not evenly fill sections of the memory array due to device-specific geometries. The disclosed defect management strategies consume memory locations that might otherwise go unused. Finally, the disclosed defect management strategies may complement higher-level defect management strategies, including those that remap or substitute physical memory locations.

Figure 1:
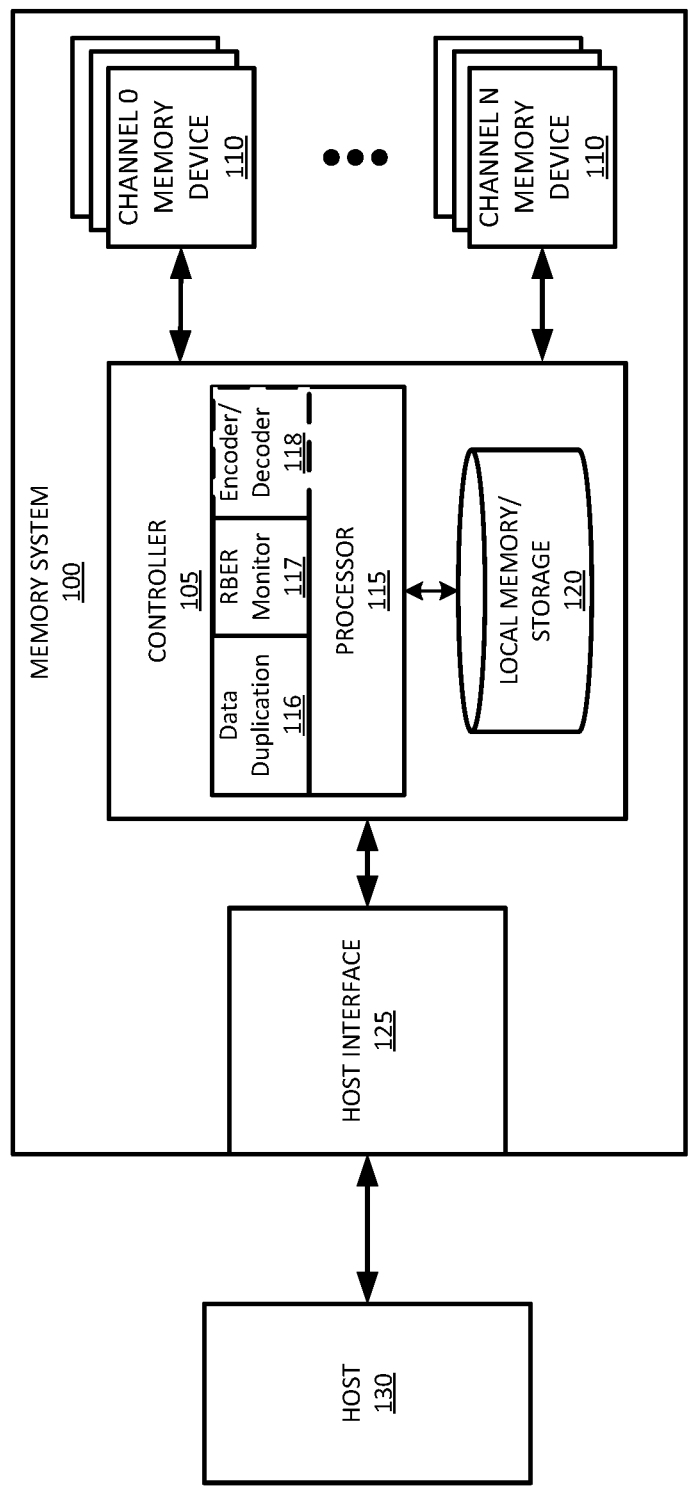
FIG. 1 illustrates, in block diagram form, an exemplary memory system including a controller that stores duplicate copies of data in a spare region of memory.

FIG. 1 illustrates, in block diagram form, an exemplary memory system 100 including a controller that stores duplicate copies of data in a spare region of memory. In one embodiment, memory devices 110 are dice that provide storage media for memory system 100. Each memory device 110 may provide three-dimensional phase change material and switching (PCMS) memory, a solid-state drive memory, or another type of storage media.

Controller 105 couples to memory devices 110 via a plurality of channels. In one embodiment, memory system 100 includes sixteen channels with eight dice per channel, for a total of one hundred twenty-eight dice. In another embodiment, memory system 100 includes another configuration of channels and dice.

Controller 105 includes processor 115 and local memory and/or storage 120. Processor 115 may be a central processing unit, microprocessor, integrated circuit, field programmable gate array, or other circuitry (collectively referred to herein as a processing device) to read, write, and maintain memory content. Processor 115 includes or otherwise implements a data duplication component 116, a raw bit error rate (RBER) monitor component 117, and, optionally, an encoder/decoder component 118. For example, each of data duplication component 116, RBER monitor component 117, and encoder/decoder component 118 may be processing logic that can include hardware (e.g., a portion of processing device 115, circuitry, dedicated logic, programmable logic, microcode, hardware of a device, integrated circuit, etc.), software (e.g., instructions run or executed on processing device 115), or a combination thereof. Processor 115 and these components perform the embodiments set forth in this document and described, e.g., with reference to FIGS. 2-15.

Local memory/storage 120 stores instructions, software, firmware, and/or data for controller 105 to execute in managing memory devices 110. For example, local memory/storage 120 may include instructions, software, firmware, and/or data for one or more of data duplication component 116, RBER monitor component 117, and encoder/decoder component 118. In one embodiment, local memory/storage 120 includes one or more hardware registers, static random-access memory (SRAM), dynamic random-access memory (DRAM), and/or another storage medium.

Memory system 100 further includes host interface 125. Host interface 125 provides an interface for passing control, address, data, and other signals between the memory system 100 and host 130. In one embodiment, host interface includes a serial advanced technology attachment (SATA) interface, peripheral component interconnect express (PCIe) interface, PCIe endpoint, universal serial bus (USB), Fibre Channel, Serial Attached SCSI (SAS), or another set of one or more connectors, input/output circuits, and/or interfaces. Host system 100 can further utilize an NVM Express (NVMe) interface to access the memory devices 110 when the memory system 100 is coupled with the host system 130 by a PCIe interface. In some embodiments, the memory system 100 is a hybrid memory/storage system.

If the addressing scheme the host 130 uses to access memory system 100 differs from the addressing scheme controller 105 uses to access memory devices 110, host interface 125 or controller 105 can translate addresses from memory system 100 addresses to memory device 110 addresses. In one embodiment, host 130 addresses memory system 100 by pages, while pages are logical structures mapped to underlying physical structures (e.g., a memory element, arrays of memory elements, access lines, etc.) within a memory device 110. Host interface 125 or controller 105 can translate between page addresses and memory addresses.

Host 130 may be a laptop, desktop, server, or other computing device that utilizes memory system 100. In one embodiment, host 130 includes a motherboard or backplane to couple to memory system 100 via host interface 125.

Exemplary Memory Architecture

Figure 2:
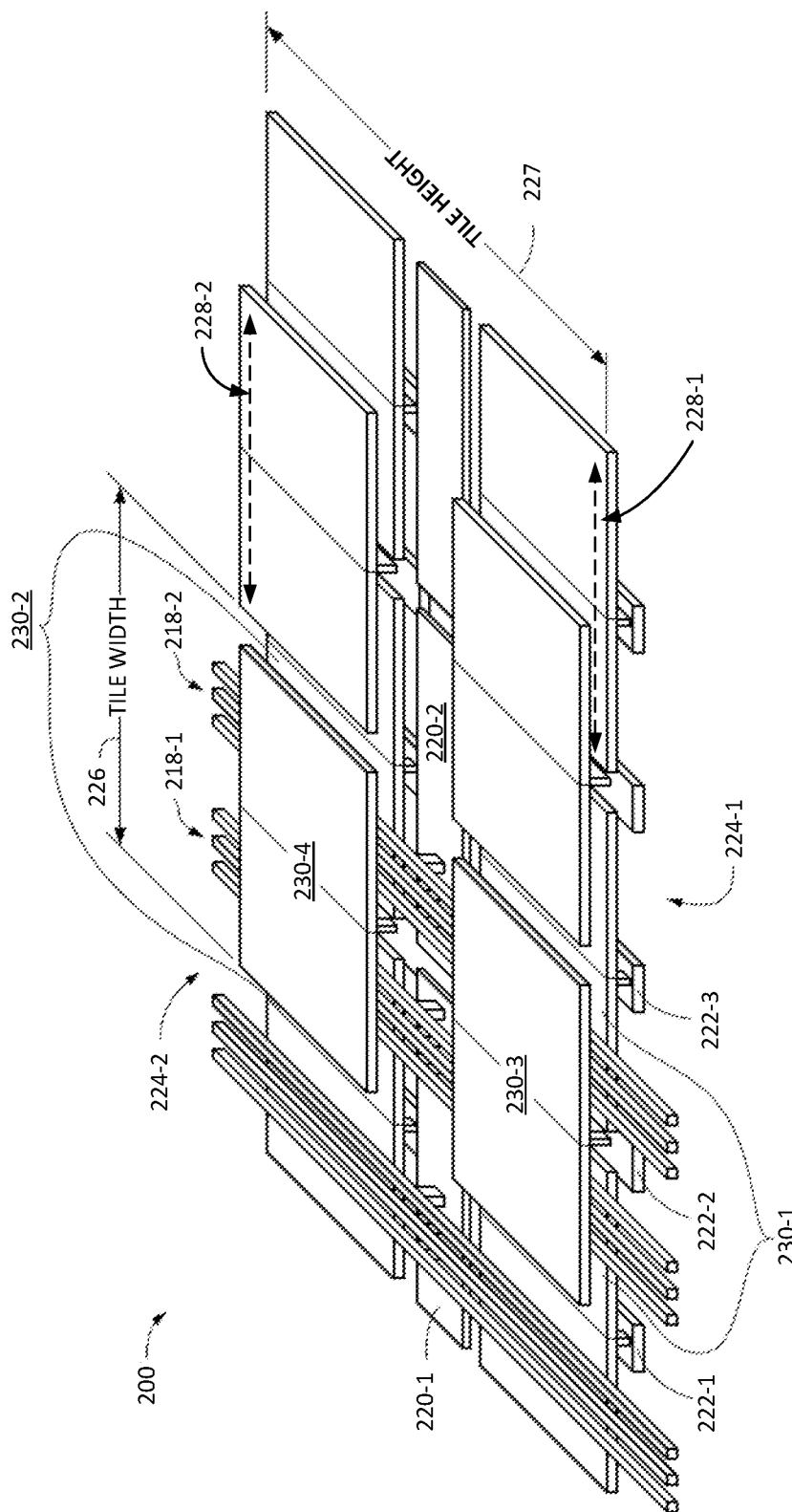
FIG. 2 illustrates an exemplary portion of an array of memory.

FIG. 2 illustrates a portion of an array of memory 200. In one embodiment array of memory 200 is a 3D Phase Change Material and Switch (PCMS) memory device. A 3D PCMS device can include memory elements having a "stack" structure. A memory element can comprise a switch element and a storage element (e.g., a switch element coupled in series with a storage element). The switch element can be a diode, field effect transistor (FET), a bipolar junction transistor (BJT), an ovonic memory switch (OMS), or an ovonic threshold switch (OTS), among others. In a number of embodiments, the memory element can comprise a memory material that can serve as both the storage element and the memory element, and which may be referred to herein as a switch and storage material (SSM). An SSM may comprise a chalcogenide alloy; however, embodiments are not so limited. In one embodiment, array of memory 200 is an example of a portion of one of memory devices 110 illustrated in FIG. 1.

Memory elements or cells (not specifically illustrated) formed in a two-dimensional array may be referred to as tiles. The tiles can include more than one deck, e.g., lower deck 224-1 and an upper deck 224-2. Tiles have a width 226 and a height 227. The tiles are divided into sub-tiles 230-1, 230-2, 230-3, 230-4. In some embodiments, the sub-tiles can be quarters of a tile. For example, sub-tiles 230-1, 230-2, 230-3, and 230-4 may collectively make one tile.

Each memory element can be addressed by a bitline and wordline combination. Wordlines may be referred to as access lines or select lines. Bitlines may be referred to as sense lines or data lines. By way of example, a tile can include two megabytes of memory elements that are accessed by 2,048 bitlines 218-1, 218-2 and 4,096 wordlines 228-1, 228-2 (not specifically illustrated). However, memory devices 200 are not limited to a particular number of bitlines 218 and/or wordlines 228-1, 228-2. The wordlines are coupled to wordline decoders 222-1, 222-2, 222-3. The bitlines are coupled to bitline decoders 220-1, 220-2. The wordline decoders 222 and the bitline decoders 220 are coupled to a controller, such as controller 105 illustrated in FIG. 1. Although FIG. 2 illustrates a particular physical memory structure, other embodiments have memory arrays with different physical structures.

Figure 3:
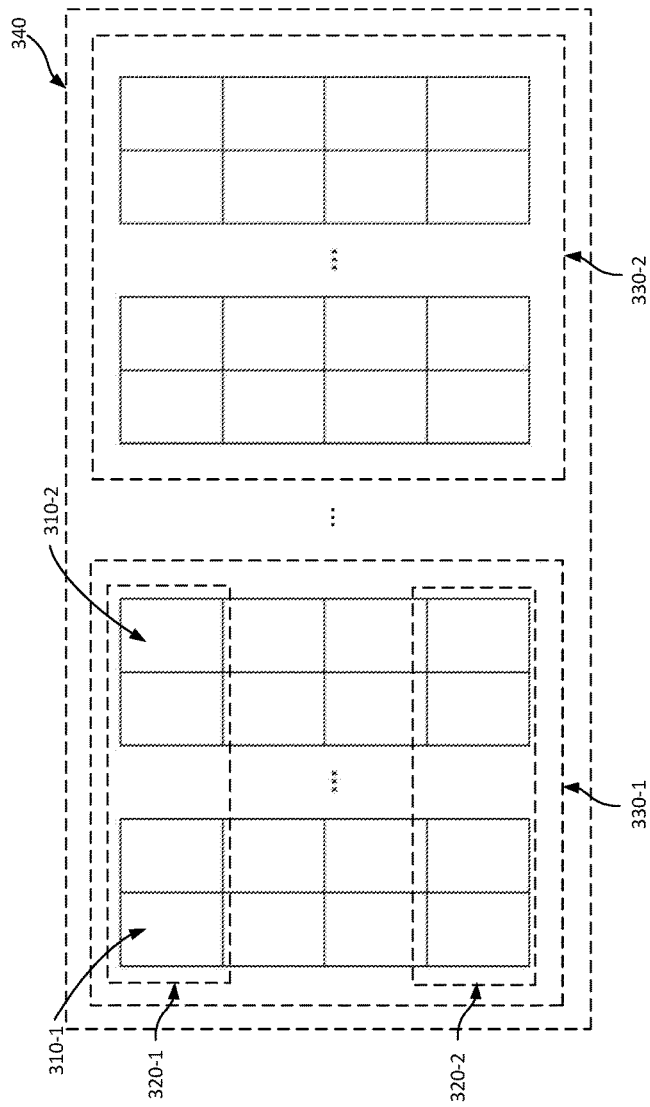
FIG. 3 illustrates an exemplary grouping of the array of memory illustrated in FIG. 2.

FIG. 3 illustrates an exemplary grouping of the array of memory illustrated in FIG. 2. A die 340 includes a plurality partitions 330. Each partition 330 includes a plurality of slices 320. Each slice 320 includes a plurality of tiles 310, each of which, as discussed above, have a plurality of memory elements. Other memory devices could have different groupings (e.g., because the layout of the read and write circuitry relative to memory elements alters how memory elements are accessed), a different number of groupings, and different group nomenclature.

Figure 4:
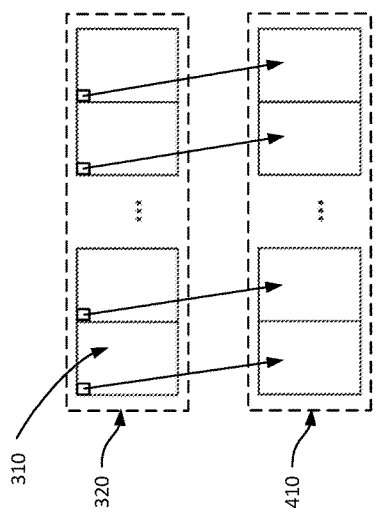
FIG. 4 illustrates an exemplary relationship of a page of memory to the grouping illustrated in FIG. 3.

FIG. 4 illustrates an exemplary relationship of a page of memory to the grouping illustrated in FIG. 3. In some embodiments, a page is the smallest addressable unit by the controller 105. In this embodiment, page 410 is a group of bits, where each bit corresponds to one bit in each tile of a slice 320. For example, if a slice contains 128 tiles, a page refers to a 16-byte (128-bit) block of memory elements. In one embodiment, pages increment sequentially first among all bits in a slice of tiles and then among all slices in a partition. If a tile comprises sixteen megabits of memory, each slice includes a corresponding number of pages.

In general, a memory device can have a number of groupings defining a number of dimensions. A memory element storing a single bit may be considered a first-dimension element, a grouping of first dimension elements may be considered a second-dimension element, and so forth. With reference to FIG. 4, a memory element or cell is a first-dimension element, a tile is a second-dimension element, a slice is a third-dimension element, a partition is a fourth-dimension element, and a die is a fifth-dimension element. Groups of die may form a sixth-dimension, etc.

Figure 5:
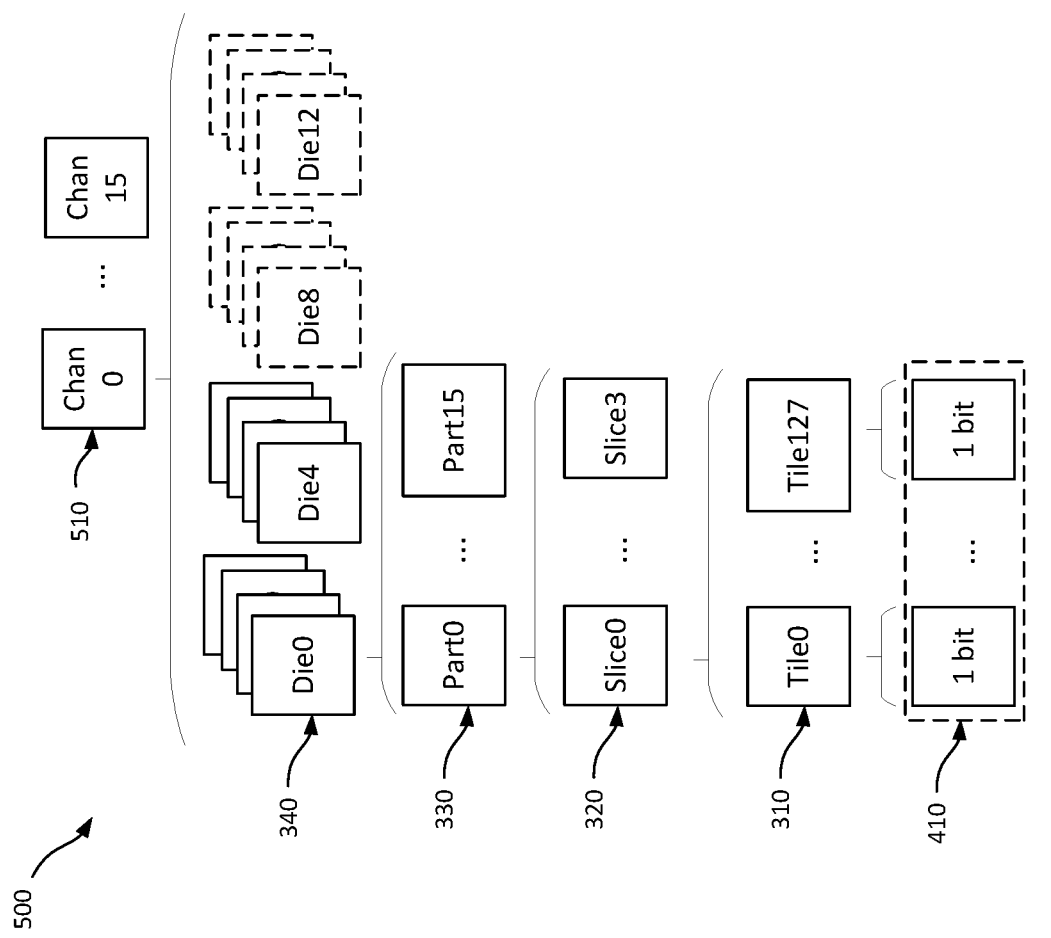
FIG. 5 illustrates an exemplary hierarchal division of a memory device.

FIG. 5 illustrates an exemplary hierarchal division of a memory device 500. In this embodiment, die 340 includes sixteen partitions 330, each partition 330 includes four slices 320, and each slice 320 includes 128 tiles 310. Memory device arrangement 500 further includes sixteen channels 510, each channel having eight or sixteen dice 340. Page 410 includes one bit from each tile 310 within a slice 320.

Mapping Data to Memory

Figure 6:
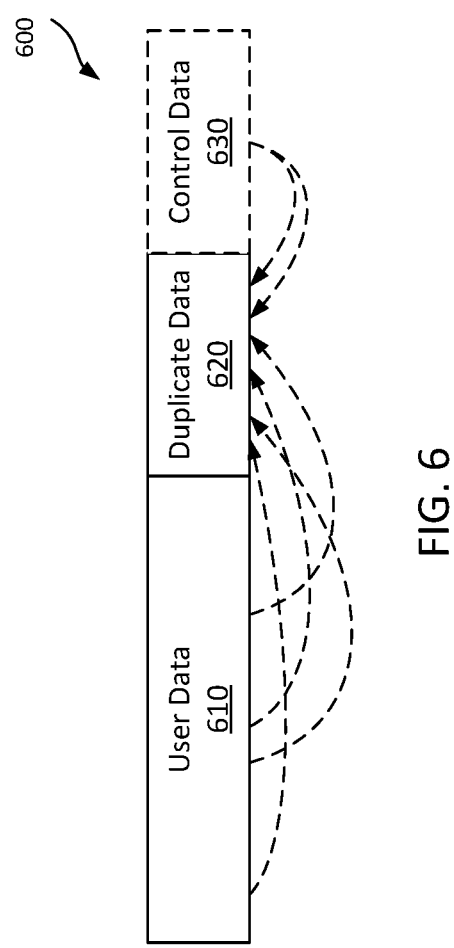
FIG. 6 illustrates the components of a write unit used to store data in a memory device.

FIG. 6 illustrates the components of a write unit 600 used to store data in a memory device. As used herein, a write unit refers to a block of data that is stored in memory, and a write unit format refers to the arrangement of data within the block. For example, a write unit may be defined as a codeword or other error-correcting code (ECC) protected block of data that encapsulates a sector (e.g., 512B) of user and/or parity data as well as other metadata and cyclic redundancy check (CRC) codes. As shown, write unit 600 includes user data 610 (also referred to as a user payload) and duplicate data 620, and may include control data 630. User data could be any form of data received from the host 130.

Control data 630 can include a variety of different kinds of data that controller 105 or its components can use to improve the performance or reliability of the memory system 100 or to provide additional features to the host 130. Examples of control data include error detection data (e.g., ECC such as BCH codes, parity data, and CRC codes), data that relates the write unit to higher-level data protection schemes (e.g., RAID block identifiers, identifiers of groups of write units, etc.), encryption data, user metadata, and other data (e.g., flags, padding, etc.). ECC can provide tiered levels of protection. For example, a first level of ECC can include parity bits that protect portions of the user data 610, metadata, and system metadata. That first level of ECC parity block can be concatenated to a second ECC parity block covering the same user data 610, metadata, system metadata but offering a more capable correction scheme at the cost of lower latency and throughput, given a particular embodiment in a constrained controller. In some embodiments, ECC protects user data 610, duplicate data 620, and at least a portion of control data 630. Other embodiments exclude duplicate data 620 from ECC protection to avoid having either to decode duplicate data before replacement can occur during a read operation or to duplicate data before an encode can occur during a write operation, as described below.

Duplicate data 620 includes data from one or both of user data 610 and control data 630. The determination of which data in user data 610 and/or control data 630 should be duplicated is described below with reference to FIG. 13.

Figure 7:
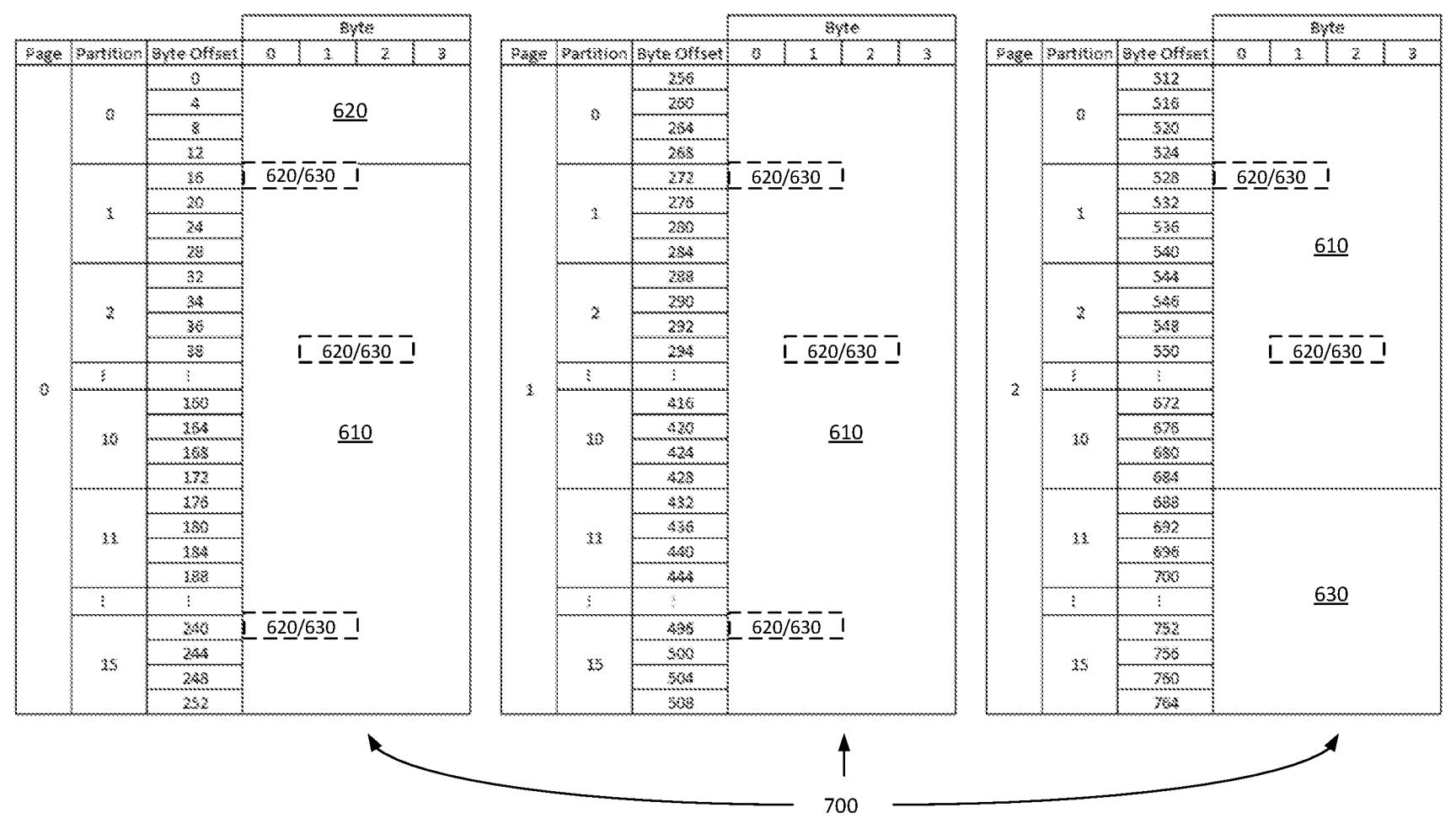

FIG. 7 illustrates an exemplary write unit format 700 and associated mapping to the memory device arrangement illustrated in FIG. 5. Write unit format 700 includes duplicate data 620, user data 610, and control data 630. As shown, write unit format 700 is mapped to 768 bytes across three pages 410 of sixteen partitions 330 of a given die. Duplicate data 620 is stored in page 0 of partition 0, control data 630 is stored in page 2 of partitions 11-15, and user data 610 is stored in the remainder of the structure. In other embodiments, the order of the user data 610, duplicate data 620, and control data 630 within a write unit format can vary. Additionally, as indicated by the dashed boxes, other write unit formats can have duplicate data 620 and/or control data 630 divided up and distributed amongst the user data 610 (thereby dividing up and distributing user data 610). If ECC data within control data 620 is interleaved within user data 610, controller 105 or encoder/decoder 118 can perform ECC operations on portions of the user data 610 while still reading the remainder of the write unit.

The mapping of a write unit within a memory device or memory device arrangement is often dictated by various geometry, architecture, and implementation parameters (e.g., the physical arrangement and grouping of the memory elements, constraints on memory element input/output operations, ECC schemes, and performance tradeoffs). For example, a particular ECC scheme can result in an amount of control data and user data that does not page-align with the architecture of the memory device. As a result, the amount of duplicate data 620 can be determined based on the number of unused bits or bytes within a block of memory after accounting for user data and control data. In the embodiment depicted in FIG. 7, write unit format 700 includes 512 bytes of user data and 226 bytes of control data, leaving 30 bytes within the three-page, sixteen-partition (768 bytes) write unit allocation for duplicate data 620.

Memory device interfaces include a finite number of data, address, and control lines, some or all of which may be multiplexed together at the interface. As a result, in some memory controller to memory device interfaces, the controller reads or writes a write unit via multiple transactions with the memory device. For example, a memory device limited to inputting or outputting 32- or 64-bit chunks of data would require requiring numerous transactions or cycles to complete an operation on a 768 byte write unit. If instructed by the host to read or write a large amount of data across such interfaces, controller 105 performs a number of sequential transactions with the memory device to carry out the instruction. The order in which the memory device outputs data during these transactions can be leveraged to improve performance of the duplication and replacement operations described herein.

In some embodiments, duplicate data 620 is positioned within a write unit so that controller 105 has early access to duplicate data 620 during a read operation. Controller 105 can buffer the duplicate data and replace duplicated bits in the remainder of the write unit while it continues to be read from the memory device, thereby reducing access latency. As shown in FIG. 7, duplicate data 620 is mapped to page 0, partition 0 of the write unit. If controller 105 has an interface to memory device(s) that first reads a write unit sequentially through partitions and then pages, duplicate data 620 would be available after reading the first partition. Controller 105 is able to then replace "bad" data with the duplicate data as the remainder of the write unit is read from memory.

Figure 8:
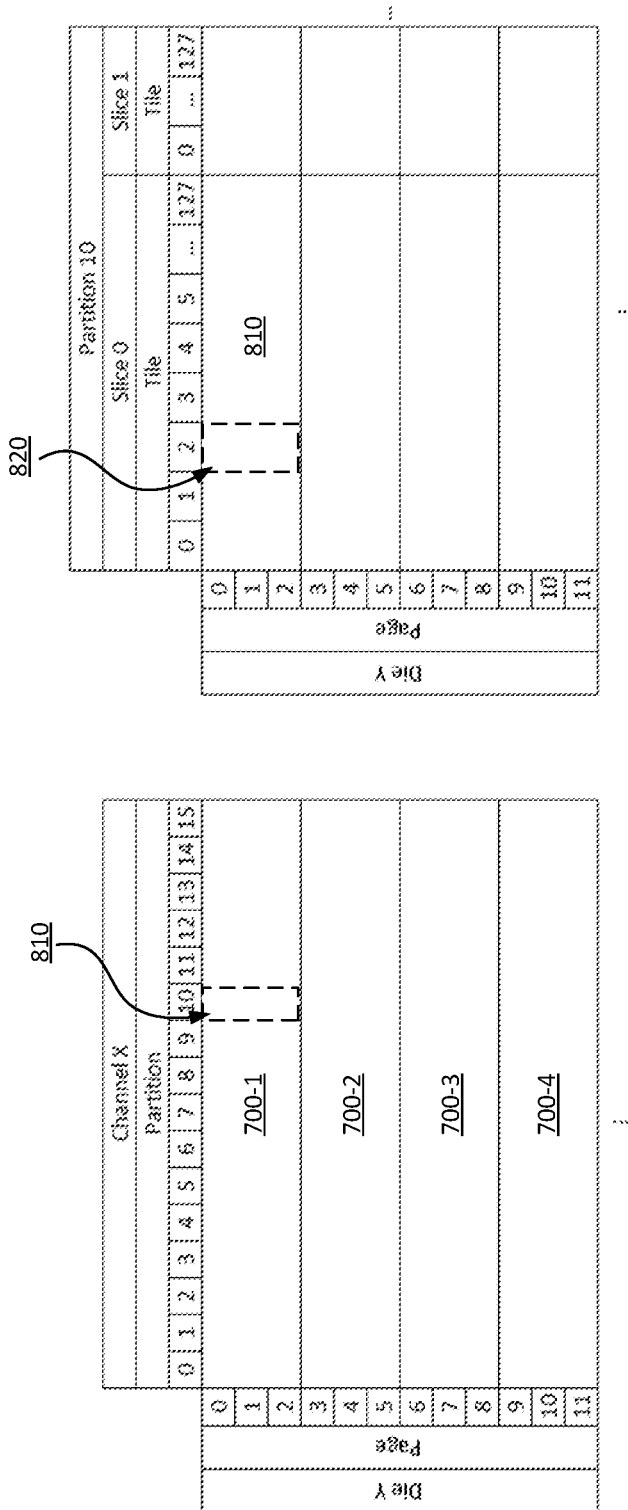
FIG. 8 illustrates characteristics of the mapping of a write unit to memory illustrated in FIG. 7.

FIG. 8 illustrates characteristics of the mapping of a write unit to memory illustrated in FIG. 7. In a memory where a tile includes N memory cells, page 0 corresponds to slice 0, page N corresponds to slice 1, page 2N corresponds to slice 2, etc. The term "stile" refers to the group of pages that a write unit spans that are associated with a particular partition. Since write unit 700-1 spans three pages, stile 810 refers to pages 0-2, or slice 0, of partition 10. The term "sliver" refers to a portion of a stile in which all the bits are localized to a particular tile. In this case, sliver 820 refers to tile 2 of slice 0 and represents 3 bits, or $1/2048^{th}$ of the overall write unit in write unit format 700.

Other embodiments map a write unit onto a different number of pages and/or partitions, or across some other memory dimensions unlike those illustrated in the memory device arrangement illustrated in FIG. 5. For example, if a write unit spanned four instead of three pages, a stile would refer to a four-page grouping and a sliver would identify four bits.

Figure 9:
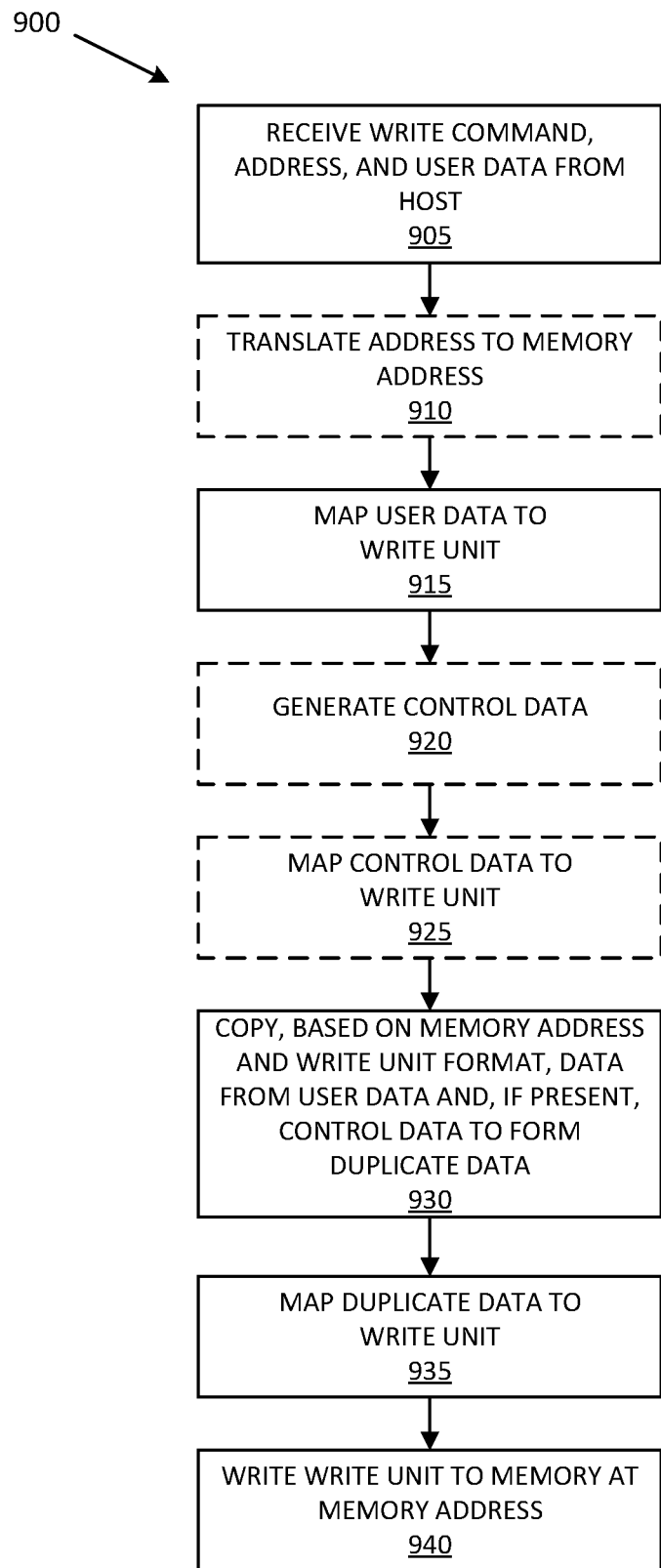
FIG. 9 is a flow chart illustrating an exemplary method of forming a write unit during a write operation.

FIG. 9 is a flow chart illustrating an exemplary method 900 of forming a write unit during a write operation. In one embodiment, controller 105 and its components, such as data duplication component 116 and/or encoder/decoder 118, carry out method 900 to write a write unit to memory devices 110. At block 905, controller 105 receives a write command, user data, and an address from the host 130, e.g., via host interface 125. If the received address is a logical or memory system address, at block 910, controller 105 translates the received address to a physical or memory device address. At block 915, controller 105 maps the user data to a write unit having some write unit format (e.g., to the user data portion of the write unit depicted in FIG. 7). At block 920, controller 105 generates control data, if included, and, at block 925, maps the control data to the write unit per the write unit format (e.g., to the control data portion of the write unit depicted in FIG. 7). At block 930, controller 105 determines which of the control and/or user data, if any, is destined for "bad" locations based on the memory address and write unit format, the details of which are described herein with reference to FIG. 13. If data is destined for a "bad" location, controller 105 duplicates that data and, at block 935, maps the duplicate data to the write unit per the write unit format (e.g., to the duplicate data portion of the write unit depicted in FIG. 7). At block 940, controller 105 writes the formed write unit to the memory device(s) 110 at the memory address.

In an alternate embodiment, controller 105 also generates control data based on the duplicated data (e.g., to encode duplicate data). In such an embodiment, the generation of control data at block 920 includes the duplicate data (e.g., controller 105 generates control data subsequent to generating duplicate data).

Controller 105 can pipeline the operations identified at the various blocks or otherwise perform operations in parallel or a different order. As one example, controller 105 can form a first portion of the write unit and write it to memory while forming a second portion of the write unit. As another example, controller 105 can generate and map a portion of control data to the write unit based on a portion of the user data (blocks 920 and 925) while duplicating data in a previously mapped portion of user data and control data (block 930).

Identifying Memory Locations For Data Duplication

Figure 10:
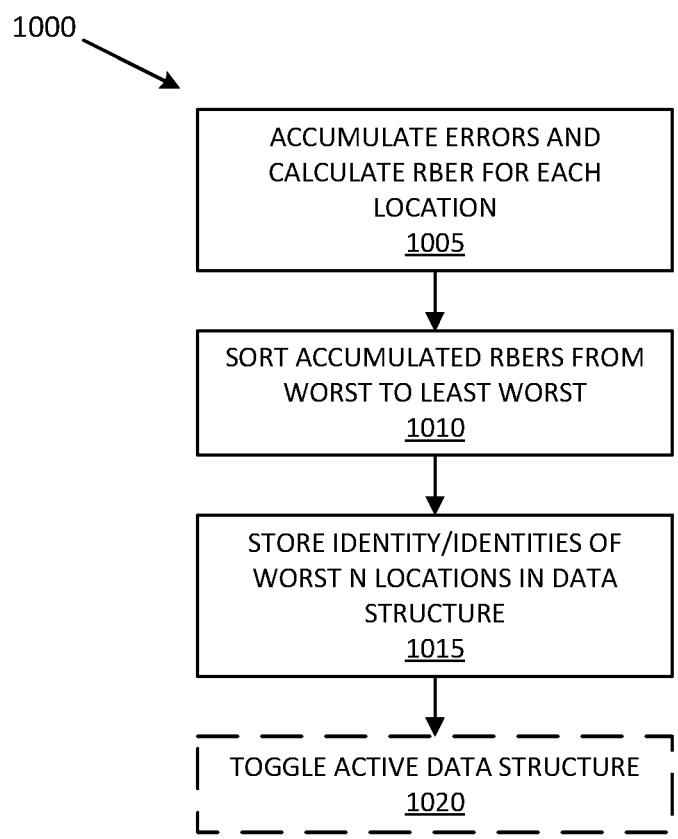
FIG. 10 is a flow chart illustrating an exemplary method of identifying memory locations for data duplication.

FIG. 10 is a flow chart illustrating exemplary method 1000 of identifying memory locations for data duplication (e.g., "bad" locations). In some embodiments, controller 105 and its components, such as RBER monitor 117, performs method 1000. At a high level, RBER monitor 117 is a continuous process that is responsible for determining the RBER of various locations of the memory, ranking the locations, e.g., from highest-to-lowest RBER, and storing the identity of the worst performing locations for data duplication as described herein. In other embodiments, controller 105 uses other performance and/or reliability metrics instead of RBER.

At block 1005, RBER monitor 117 accumulates errors (e.g., errors detected during an ECC process) and calculates an RBER value for each tile. In one embodiment, the monitored locations correspond to tiles, although other dimensions of elements may be monitored. A tile may be divided into sub-tiles, and RBER monitor 117 accumulates RBER for each sub-tile for later summation. The calculated RBER values may be an average of the most recent accumulation or summation of errors for the tile with the historical RBER values, if any, for the tile. At block 1010, RBER monitor 117 sorts the calculated RBER values to identify the worst performing tiles. Tile sorting can occur after each tile has had its RBER measured the same number of times (e.g., once, twice, etc.) to ensure sampling is normalized across tiles. In some embodiments, only tiles whose accumulated RBER value has exceeded a threshold value are sorted. At block 1015, RBER monitor 117 stores the memory location identifier (MLI) of some number of the worst tiles in a data structure for later use in determining which bits in a write unit to duplicate (e.g., during a write operation) or were duplicated (e.g., during a read operation). In one embodiment, RBER monitor 117 stores the MLI of the three or four worst RBER tiles in the data structure. In another embodiment, RBER monitor 117 stores the MLI of five or more of the worst RBER tiles in the data structure. If no tiles are identified (e.g., due to insufficient RBER data), RBER monitor 117 may store a value indicating that no tiles are identified (e.g., with valid bit(s), described below). The order of the MLIs stored in an entry may be based on the enumerated identity of the tiles (e.g., lowest to highest) or the metric (e.g., worst-to-least-worst).

In some embodiments, controller 105 builds and maintains two MLI data structures: one active data structure for use during memory read and write operations and another scratch data structure for accumulating, sorting, and reconciling performance or reliability metrics. In such embodiments, method 1000 relates to modifying the scratch data structure. At block 1020, RBER monitor 117 may set a bit or other flag for controller 105 or data duplication component 116 to toggle the scratch data structure to the active data structure and vice versa.

In some embodiments, changing the active data structure could corrupt data in write units that were written before the change and read after the change. To avoid corruption, controller 105 maintains two active data structures and associates a phase bit with each write unit that identifies which of the two active data structures was used during the last write of the write unit. In such embodiments, RBER monitor 117 updates the first active data structure. Controller 105 uses the first active data structure to perform some number of write operations and sets the phase bit associated with each data structure to indicate the first active data structure governed the last write. Later, RBER monitor 117 updates the second active data structure. Controller 105 then performs a refresh operation, reading all of the write units with the first active data structure, writing the write units with the second active data structure, and updating the phase bit associated with each data structure to indicate the second active data structure governed the last write. The refresh operation may occur as part of a regularly scheduled refresh or in response to the updated active data structure. The refresh may refresh all write units at once or over a period of time and interleaved with other controller 105 or host 130 operations.

Figures 11, 12:
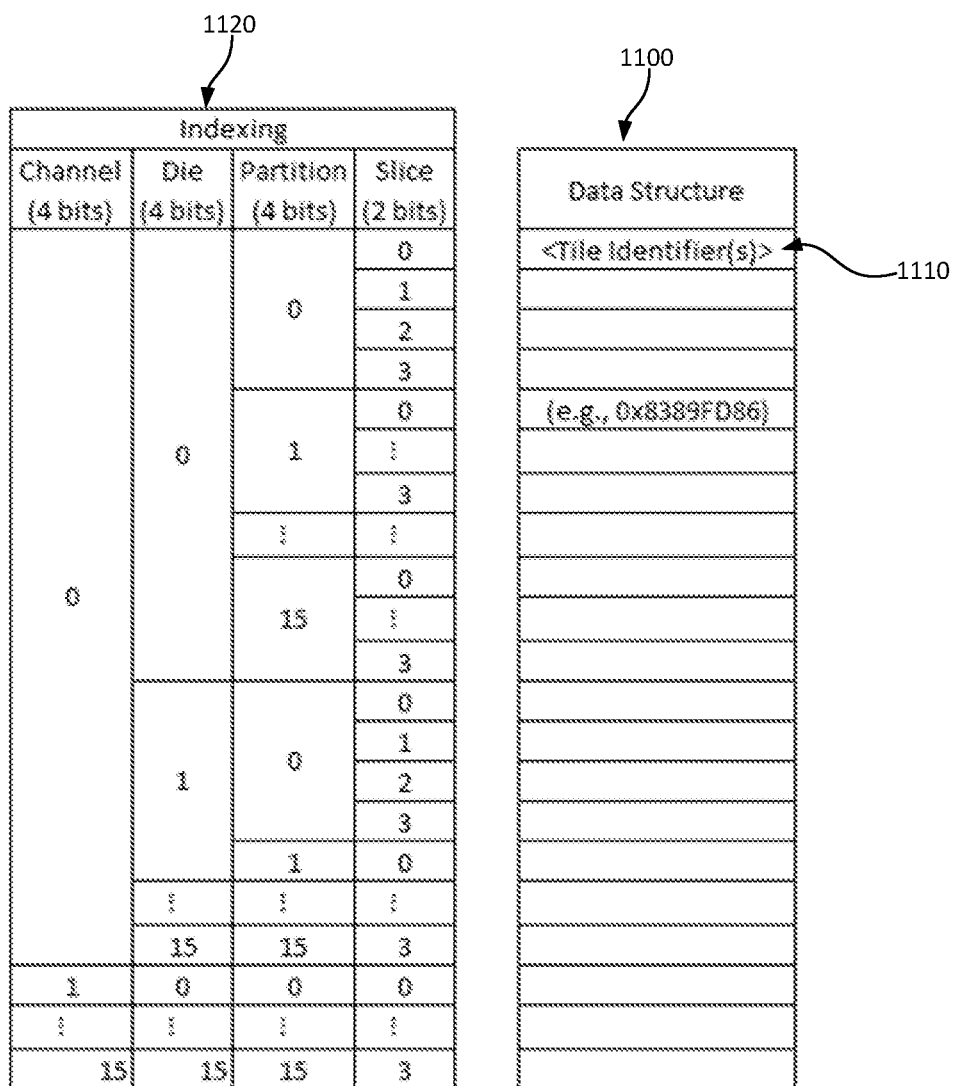
FIG. 11 illustrates an exemplary data structure for storing memory location identifiers.
FIG. 12 illustrates exemplary memory location identifier formats.

FIG. 11 illustrates an exemplary data structure 1100 for storing MLIs. In this embodiment, data structure 1100 is a table with an entry corresponding to an indexed element dimension—the tile. Other embodiments may use different data structures, such as a graph or tree data structure. In some embodiments, MLI data structure 1100 is stored in local memory 120.

As shown, indexing scheme 1120 resolves entries in the table to a slice (e.g., a third-dimension element) based on the memory device arrangement illustrated in FIG. 5. Accordingly, an entry within MLI data structure 1100 can identify one or more tiles (e.g., second-dimension elements), as described below, or even lower-dimension elements, given enough data. In some embodiments, the index resolves to an element of a higher or a lower dimension. MLI data structure 1100 may be divided into multiple tables, e.g., on a per-channel or per-die basis, and multiple processes or components could handle data duplication or replacement, as described below, for each division.

FIG. 12 illustrates exemplary MLI formats. Identifier 1210 is a binary value having N bits, where N is determined based on the number of elements within the indexed element dimension. For example, if the MLI data structure is indexed to slices (as is shown in FIG. 11) and a slice contains 128 tiles, N would be seven (7) to uniquely identify any tile within a slice with a binary value. More than seven bits may be used to identify sub-tiles and/or fewer than seven bits may be used to identify groups of tiles.

Like identifier 1210, identifier 1220 also identifies tiles with a binary value having N bits. Identifier 1220 further includes an additional bit, which may be a valid bit or flag, to indicate whether the value is valid so to prevent arbitrary data duplication and replacement. For example, if RBER monitor 117 has collected insufficient data to identify the worst-RBER tiles within a slice, RBER monitor 117 sets or initializes the valid bits for that entry within the data structure to invalid. In one embodiment, RBER monitor 117 sets the valid bit to invalid after a system reset.

In one embodiment, a MLI data structure includes space for four tile identifiers per slice using tile identifier format 1220 (8 bits per identifier). With reference to FIG. 10, at blocks 1005-1010, RBER monitor 117 may have determined that tiles 3, 9, 125, and 6 within the stile associated with slice 0 of partition 1 of die 0 of channel 0 are the four worst tiles in that slice, from worst to least-worst. If a '1' indicates a valid tile identifier, RBER monitor 117 may write 0x8389FD86 (i.e., the ordered valid bits prefixing the values of 3, 9, 125, and 6, respectively) to the entry in the data structure corresponding to {channel 0, die 0, partition 1, slice 0}.

Writing to and Reading From Memory With Duplicate Data

Figure 13:
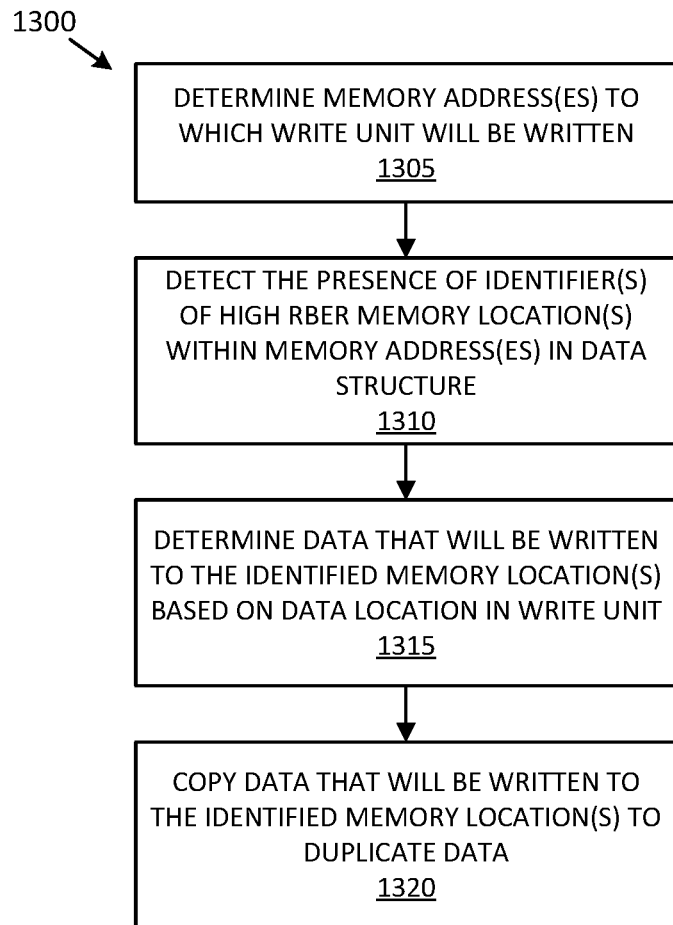
FIG. 13 is a flow chart illustrating an exemplary method of duplicating data within a write unit during a write operation.

FIG. 13 is a flow chart illustrating an exemplary method 1300 of duplicating data within a write unit during a write operation. Method 1300 may correspond to the operations at block 930 in FIG. 9 and be carried out by controller 105 and/or data duplication component 116. At block 1305, controller 105 determines the address range at which the write unit will be written to the memory. For example, if the write unit format is as depicted in FIG. 7, controller 105 may determine that a write unit will be written to pages 0-2 and partitions 0-15 of {channel 0, die 0}.

At block 1310, controller 105 reads the MLI data structure to detect the presence of identifiers of memory location(s) having the worst performance that are associated with the destination address(es) for the write unit. At block 1315, controller 105 determines what data will be written to the identified memory location(s) based on the location of the data within a write unit. At block 1320, controller 105 copies data that will be written to the identified memory location(s) to the spare/duplicate data portion of the write unit. If an identifier in the data structure is invalid, controller 105 can write random data to the corresponding duplicate data portion of the write unit to maintain memory cell plasticity and minimize RBER. Controller 105 can generate the random data or source it from parts of the user data portion of the write unit. The duplicated data can be mapped to respective portion of the write unit (not shown).

Figure 14:
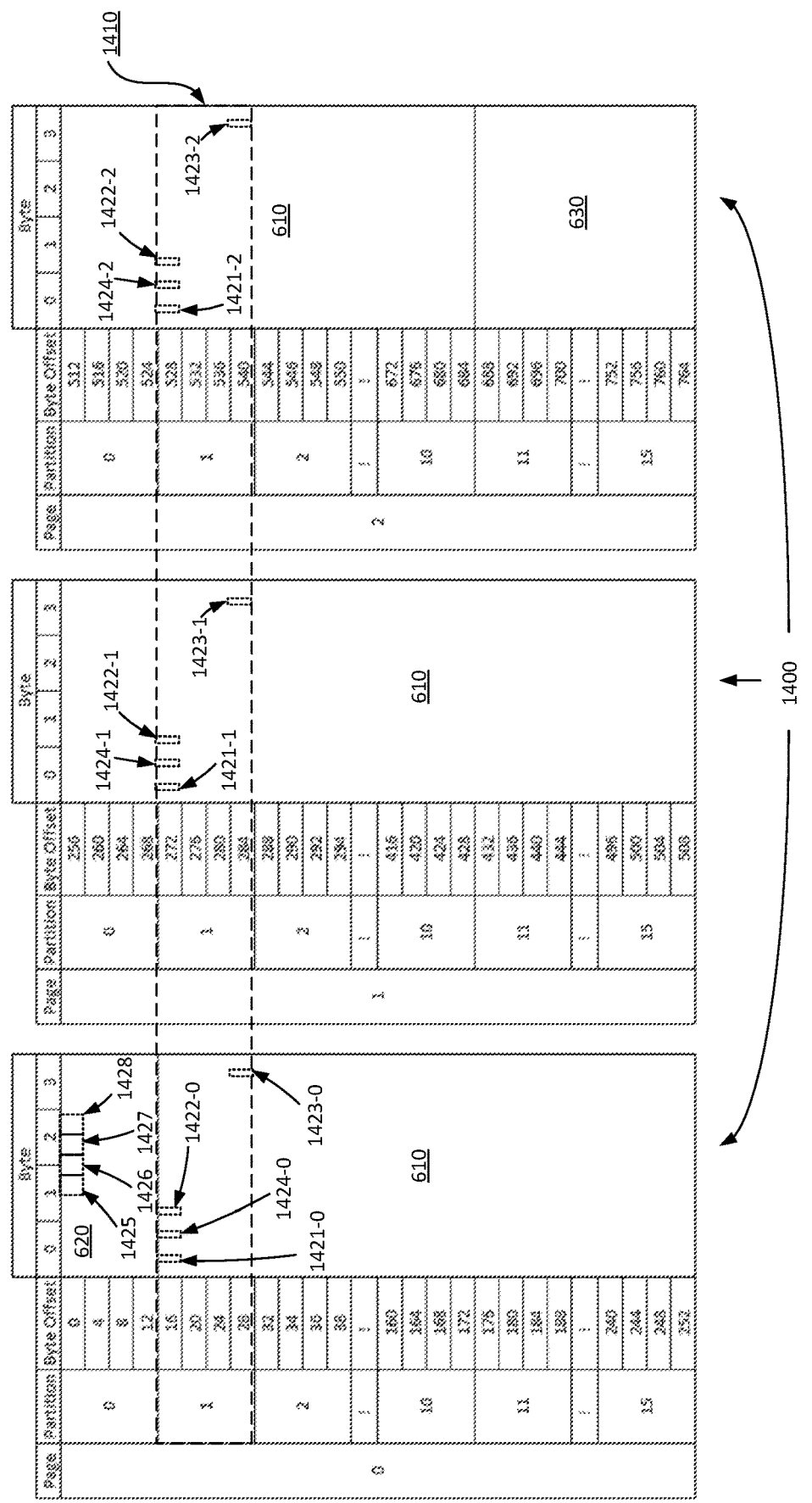
FIG. 14 illustrates the effect of the method illustrated in FIG. 13 on an exemplary write unit during a write operation.

FIG. 14 illustrates the effect of the method illustrated in FIG. 13 on an exemplary write unit 1400 during a write operation. As shown, write unit 1400 includes user data 610, duplicate data 620, and control data 630 in the write unit format depicted in FIG. 7.

In this example, controller 105 has determined that write unit 1400 will be written to pages 0-2 and partitions 0-15 of {channel 0, die 0} (block 1305). Because the write unit 1400 spans the first slice (pages 0-2) from each of sixteen partitions, controller 105 reads sixteen entries from the MLI data structure {partitions 0-15, slice 0}.

When controller 105 reads the value 0x8389FD86 from the entry corresponding to stile 1410 {partition 1, slice 0} in the MLI data structure (block 1310), the controller 105 determines that tiles 3, 9, 125, and 6 within stile 1410 are "bad." Controller 105 then determines that bits 1421-0 through 1421-2 (sliver 3), 1422-0 through 1422-2 (sliver 9), 1423-0 through 1423-2 (sliver 126), and 1424-0 through 1424-2 (sliver 6) will be written to those "bad" tiles, or tiles with an elevated RBER (block 1315).

Consequently, controller 105 duplicates the data in slivers 1421, 1422, 1423, and 1424 to a portion of the duplicate data 620 at a location corresponding to that stile. The location of duplicates for each stile within duplicate data 620 can correspond to the partition order for the write unit. In this case, three bits are duplicated per sliver and the tile identifier data structure identifies four slivers per stile, so twelve bits of duplicate data are needed per sliver. Bit locations 0-11 in duplicate data 620 would correspond to the stile associated with partition 0, bit locations 12-23 would correspond to the stile associated with partition 1, etc. Thus, the location of duplicate data for slivers 1421-1424 corresponds to duplicate data at locations 1425-1428, respectively, at bit locations 12-23 of duplicate data 620.

The bit order of the three duplicate bits per sliver may be any order, so long as duplicates are used to replace data during a read operation in the same order the duplicates were created during the write operation.

In this example, a total of 192 bits can duplicate data from the four worst performing slivers from each of the sixteen stiles that will store write unit 1400. As or once controller 105 has duplicated data, controller 105 may write write unit 1400 to memory at pages 0-2 and partitions 0-15 of {channel 0, die 0}. In this manner, duplicate data is stored in a spare region of the memory to the original data.

Note that in some scenarios, duplicate data 620 may be written to "bad" slivers. In the write structure 1400 depicted in FIG. 14, this could occur for data in partition 0. Duplicate data written to bad slivers may be reconciled with the original data during the read operation, as described below.

Figure 15:
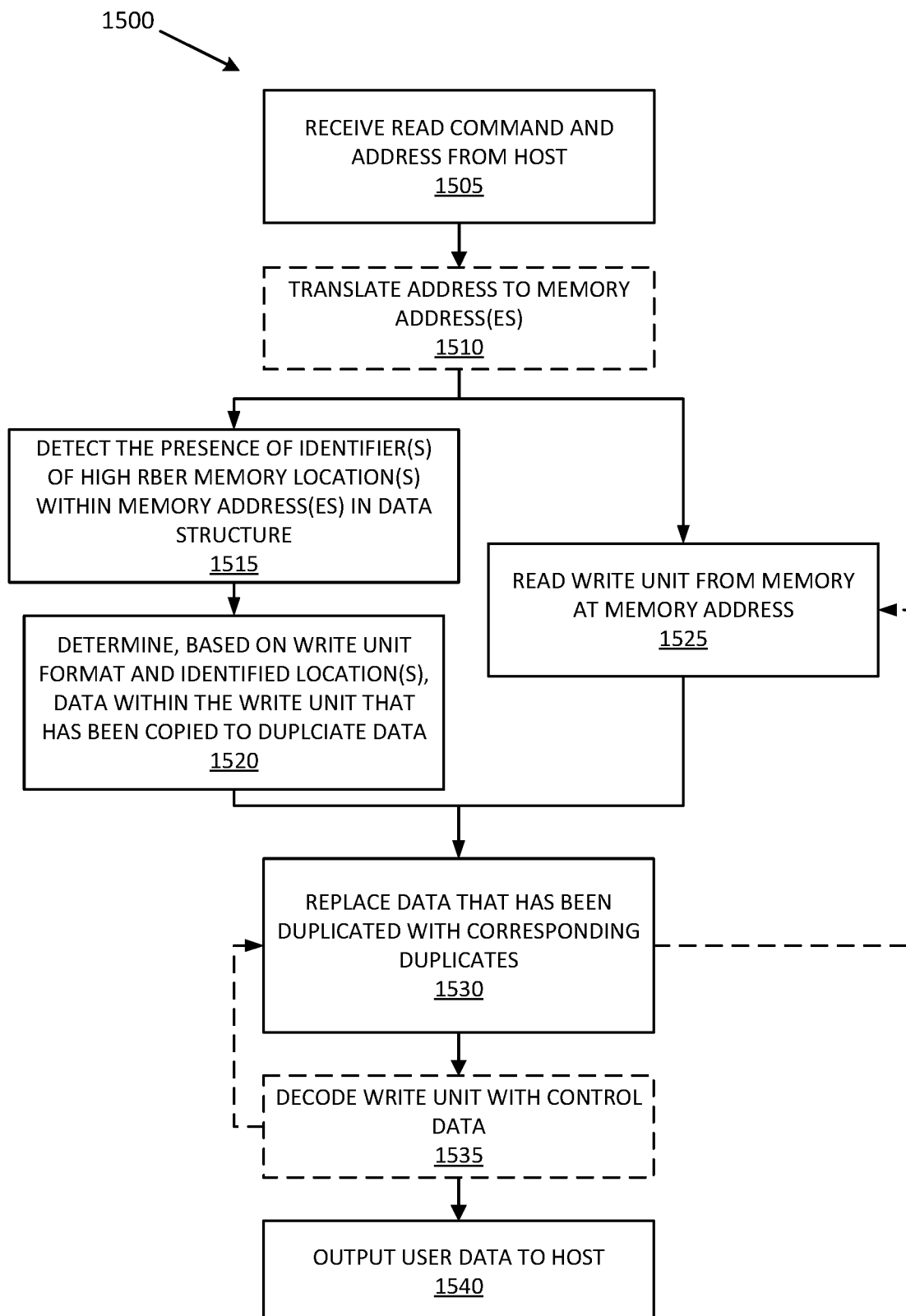
FIG. 15 is a flow chart illustrating an exemplary method of replacing data within a write unit read from memory.

FIG. 15 is a flow chart illustrating an exemplary method 1500 of replacing data within a write unit read from memory. Method 1500 may be carried out by controller 105 and/or data duplication component 116. At block 1505, controller 105 receives a read command and an address from the host 130, e.g., via host interface 125. At block 1510, if the received address is a memory system address, controller 105 translates the received address to a memory device address or addresses. Following the example above, the memory address may correspond to the location in memory storing write unit 1400.

At block 1515, controller 105 reads the data structure to detect the presence of identifier(s) of memory locations which have had bits copied to duplicate data during a write operation due to a high RBER. In some embodiments, the data structure is stored in local memory 120. Continuing the example, because the write unit 1400 spans the first slice (pages 0-2) from each of sixteen partitions, controller 105 reads sixteen entries from the tile identifier data structure {partitions 0-15, slice 0}. Using the example above again, the entry corresponding to stile 1410 {partition 1, slice 0 } in the tile identifier data structure can be the value 0x8389FD86.

At block 1520, controller 105 determines which bits within the write unit were copied to duplicate data when the write unit was written to memory based on the write unit format and the identified memory locations. In this example, controller 105 determines that data in tiles 3 (0x83), tile 9 (0x89), tile 125 (0xFD), and tile 6 (0x86) may have an elevated RBER and, as such, have duplicates in the duplicate data 620 of write unit 1400.

At block 1525, controller 105 reads the write unit from memory. As mentioned, controller 105 reading a write unit from memory can span multiple transactions. As shown, the read occurs in parallel with the operations of blocks 1515 and/or 1520 to improve access latency. In other embodiments, the read can occur in series with blocks 1515 and 1520.

At block 1530, controller 105 replaces the data in the write unit stored in the identified memory location(s) with the duplicate data in the write unit, if any. In the example, given the partition-based duplicate data ordering within duplicate data 620, controller 105 can replace data from sliver 1421 with duplicate data 1425, data from sliver 1422 with duplicate data 1426, data from sliver 1423 with duplicate data 1427, and data from sliver 1424 with duplicate data 1428. If duplicate data 620 was encoded, controller 105 may have to decode at least a portion of write unit before replacement can occur.

In some cases, a write unit maps to a region of memory in which the duplicate data portion of the write unit corresponds to memory locations having a high RBER. Controller 105 reads the MLI data structure and determines that controller 105 will be writing the duplicate data portion of a write unit to one or more bad memory locations. In some embodiments, while building a write unit and writing it to memory, controller 105 does not copy data from the original data portion of the write unit into the duplicate data portion of the write unit that is destined for the bad location(s). During a later read operation, controller 105 reads the MLI data structure and determines that one or more portions of the duplicate data were written to bad memory locations and does not replace original data with duplicate data. In other embodiments while building a write unit and writing it to memory, controller 105 does copy data from the original data portion of the write unit into the duplicate data portion of the write unit that is destined for the bad location(s). During a later read operation, controller 105 reads the MLI data structure and determines that one or more portions of the duplicate data were written to bad memory locations. Then, if the RBER of memory locations to which the duplicate data was written is less than the RBER of the memory locations to which the corresponding original data was written, controller 105 replaces bits in the original data with their corresponding duplicates.

At block 1535, controller 105 or encoder/decoder 118 decodes the encoded portion of the write unit having the replaced data, provided it was encoded during the write operation. In one embodiment, the decode operation includes decoding BCH codes. If the replaced data prevents errors from manifesting when calculating the syndromes during BCH decoding, additional ECC decoding operations are avoided. In general, when duplicate data replacement occurs before decoding (e.g., ECC decoding), performance can improve if the unreplaced bits from high RBER memory locations would have triggered additional ECC operations.

If duplicate data was encoded, controller 105 returns to block 1530 to perform data replacement. At block 1540, controller 105 outputs the user data to the host 130.

As mentioned above, depending on the memory interface, reading a write unit from memory may span multiple transactions. In embodiments in which duplicate data 620 is mapped within the write unit such that controller 105 has early access to duplicate data 620 during a read operation, controller 105 can read the duplicate data portion of the write unit within the first $N_d$ transactions with the memory, where the total number of transactions to read a write unit from memory is $N_t$ and $N_d<N_t$. Controller 105 can buffer the duplicate data and replace duplicated bits in the remainder of the write unit as it is being read from memory.

It will be apparent from this description that aspects of the inventions may be embodied, at least in part, in software. That is, a computer system or other data processing system, such as controller 105, may carry out the computer-implemented methods 900, 1000, 1300, and 1500 in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of 105, and, in some embodiments, fewer components than that shown in FIG. 1 may also be used in duplicating data to a spare portion of the memory to provide, for example, bit-level redundancy.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate optional operations that add additional features to embodiments of the invention. However, such notation should not be taken to mean that these are the only options or optional operations, and/or that blocks with solid borders are not optional in some embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
receiving a user payload to be written to a memory;
determining a plurality of locations within the memory within which the user payload is to be written;
detecting, within a data structure, the presence of an identifier of a first location within a user data portion of the plurality of locations;
writing the user payload to the user data portion of the plurality of locations; and
in response to detecting the presence of the identifier in the data structure, writing a copy of one or more bits in the user payload written to the first location to a spare data portion of the plurality of locations.

2. The computer-implemented method of claim 1, further comprising encoding the user payload to form an encoded user payload without encoding the copy of one or more bits, and wherein the writing the user payload to the user data portion of the plurality of locations comprises writing the encoded user payload.

3. The computer-implemented method of claim 1, wherein writing the user payload to at least the user data portion of the plurality of locations and writing the copy of one or more bits in the user payload to the spare data portion of the plurality of locations are part of a single write operation.

4. The computer-implemented method of claim 1, wherein the memory is comprised of a plurality of tiles, each tile including a plurality of memory cells, and wherein a plurality of tiles forms a slice and a location identifies a tile within a slice.

5. The computer-implemented method of claim 1, further comprising:
collecting raw bit error rate (RBER) data associated with each location in the plurality of locations;
storing an identifier of a first worst RBER location in the data structure, wherein the first worst RBER location is the first location.

6. The computer-implemented method of claim 5, further comprising:
collecting additional RBER data associated with each location in the plurality of locations;
storing an identifier of a new worst RBER location based at least in part on the additional RBER data, wherein the new worst RBER location is different than the first worst RBER location.

7. The computer-implemented method of claim 1, further comprising:
generating error detection data based at least in part on the user payload;
detecting, within the data structure, the presence of a second identifier of a second location within an error detection portion of the plurality of locations;
writing the error detection data to the error detection portion of the plurality of locations; and
in response to detecting the presence of the second identifier in the data structure, writing a copy of one or more bits in the error detection data written to the second location to the spare data portion of the plurality of locations.

8. The computer-implemented method of claim 1, further comprising:
receiving a request to read the user payload from the memory;
determining the plurality of locations within the memory within which the user payload is written;
detecting, within a data structure, the presence of the identifier of the first location within the user data portion of the plurality of locations;
reading the user data portion and the spare data portion within the plurality of locations;
in response to detecting the presence of the identifier in the data structure, replacing one or more bits read from the first location of the user data portion with the copy of the one or more bits read from the spare data portion.

9. A non-transitory computer-readable medium storing instructions, which when executed by a processing device, cause the processing device to perform a method comprising:
receiving a user payload to be written to a memory;
determining a plurality of locations within the memory within which the user payload is to be written;
detecting, within a data structure, the presence of an identifier of a first location within a user data portion of the plurality of locations;
writing the user payload to the user data portion of the plurality of locations; and
in response to detecting the presence of the identifier in the data structure, writing a copy of one or more bits in the user payload written to the first location to a spare data portion of the plurality of locations.

10. The non-transitory computer-readable medium of claim 9, the method further comprising encoding the user payload to form an encoded user payload without encoding the copy of one or more bits, and wherein the writing the user payload to the user data portion of the plurality of locations comprises writing the encoded user payload.

11. The non-transitory computer-readable medium of claim 9, wherein writing the user payload to at least the user data portion of the plurality of locations and writing the copy of one or more bits in the user payload to the spare data portion of the plurality of locations are part of a single write operation.

12. The non-transitory computer-readable medium of claim 9, wherein the memory is comprised of a plurality of tiles, each tile including a plurality of memory cells, and wherein a plurality of tiles forms a slice and a location identifies a tile within a slice.

13. The non-transitory computer-readable medium of claim 9, the method further comprising:
collecting raw bit error rate (RBER) data associated with each location in the plurality of locations;
storing an identifier of a first worst RBER location in the data structure, wherein the first worst RBER location is the first location.

14. The non-transitory computer-readable medium of claim 13, the method further comprising:
collecting additional RBER data associated with each location in the plurality of locations;
storing an identifier of a new worst RBER location based at least in part on the additional RBER data, wherein the new worst RBER location is different than the first worst RBER location.

15. The non-transitory computer-readable medium of claim 9, the method further comprising:
generating error detection data based at least in part on the user payload;
detecting, within the data structure, the presence of a second identifier of a second location within an error detection portion of the plurality of locations;
writing the error detection data to the error detection portion of the plurality of locations; and
in response to detecting the presence of the second identifier in the data structure, writing a copy of one or more bits in the error detection data written to the second location to the spare data portion of the plurality of locations.

16. The non-transitory computer-readable medium of claim 9, the method further comprising:
receiving a request to read the user payload from the memory;
determining the plurality of locations within the memory within which the user payload is written;
detecting, within a data structure, the presence of the identifier of the first location within the user data portion of the plurality of locations;
reading the user data portion and the spare data portion within the plurality of locations;
in response to detecting the presence of the identifier in the data structure, replacing one or more bits read from the first location of the user data portion with the copy of the one or more bits read from the spare data portion.

17. An apparatus comprising:
a processing device; and
a local memory coupled to the processing device, the local memory storing instructions which, when executed by the processing device, cause the processing device to:
receive a user payload to be written to a memory;
determine a plurality of locations within the memory within which the user payload is to be written;
detect, within a data structure, the presence of an identifier of a first location within a user data portion of the plurality of locations;
write the user payload to the user data portion of the plurality of locations; and
in response to detecting the presence of the identifier in the data structure, write a copy of one or more bits in the user payload written to the first location to a spare data portion of the plurality of locations.

18. The apparatus of claim 17, wherein writing the user payload to at least the user data portion of the plurality of locations and writing the copy of one or more bits in the user payload to the spare data portion of the plurality of locations are part of a single write operation.

19. The apparatus of claim 17, wherein the instructions further cause the processing device to:
collect raw bit error rate (RBER) data associated with each location in the plurality of locations;
store an identifier of a first worst RBER location in the data structure, wherein the first worst RBER location is the first location.

20. The apparatus of claim 17, wherein the instructions further cause the processing device to:
receive a request to read the user payload from the memory;
determine the plurality of locations within the memory within which the user payload is written;
detect, within a data structure, the presence of the identifier of the first location within the user data portion of the plurality of locations;
read the user data portion and the spare data portion within the plurality of locations;
in response to detecting the presence of the identifier in the data structure, replace one or more bits read from the first location of the user data portion with the copy of the one or more bits read from the spare data portion.

* * * * *